United States Patent
Schulte et al.

(10) Patent No.: US 9,371,898 B2
(45) Date of Patent: Jun. 21, 2016

(54) CONTROL SYSTEM FOR A MACHINE WITH A DUAL PATH ELECTRONICALLY CONTROLLED HYDROSTATIC TRANSMISSION

(71) Applicant: CNH America, LLC, New Holland, PA (US)

(72) Inventors: David Schulte, Clarendon Hills, IL (US); Kushan Vora, Willowbrook, IL (US); Bruce Arndt, Algonquin, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/066,118

(22) Filed: Oct. 29, 2013

(65) Prior Publication Data

US 2014/0174066 A1    Jun. 26, 2014

Related U.S. Application Data

(60) Provisional application No. 61/740,788, filed on Dec. 21, 2012, provisional application No. 61/740,750, filed on Dec. 21, 2012, provisional application No. 61/740,772, filed on Dec. 21, 2012, provisional application No. 61/740,811, filed on Dec. 21, 2012.

(51) Int. Cl.

| | |
|---|---|
| *F16H 61/40* | (2010.01) |
| *F16H 39/14* | (2006.01) |
| *B60W 10/00* | (2006.01) |
| *E02F 9/22* | (2006.01) |
| *F16H 61/431* | (2010.01) |
| *F16H 61/46* | (2010.01) |
| *E02F 3/84* | (2006.01) |
| *F16H 61/47* | (2010.01) |

(52) U.S. Cl.
CPC ............ *F16H 39/14* (2013.01); *B60K 41/004* (2013.01); *E02F 3/841* (2013.01); *E02F 9/2246* (2013.01); *E02F 9/2292* (2013.01); *F16H 61/431* (2013.01); *F16H 61/46* (2013.01); *F16H 61/47* (2013.01)

(58) Field of Classification Search
None
See application file for complete search history.

(56) References Cited

U.S. PATENT DOCUMENTS

| | | | |
|---|---|---|---|
| 3,247,919 A | 4/1966 | Moon, Jr. | |
| 3,795,107 A | 3/1974 | Ward | |
| 3,914,938 A * | 10/1975 | Cornell | B62D 11/183 180/6.48 |
| 4,019,596 A | 4/1977 | Crull | |
| 4,023,637 A | 5/1977 | Jackovich | |
| 4,086,767 A | 5/1978 | Byers, Jr. | |
| 4,103,489 A | 8/1978 | Fletcher et al. | |
| 4,399,886 A | 8/1983 | Pollman | |
| 4,461,147 A | 7/1984 | Myers | |
| 4,523,892 A | 6/1985 | Mitchell et al. | |
| 4,531,601 A | 7/1985 | Barbagli | |
| 4,534,707 A | 8/1985 | Mitchell | |
| 4,739,616 A | 4/1988 | Myers | |
| 4,932,208 A | 6/1990 | Koyama et al. | |
| 5,001,900 A | 3/1991 | Sasajima et al. | |
| 5,048,293 A | 9/1991 | Aoyagi | |

(Continued)

*Primary Examiner* — John R Olszewski
*Assistant Examiner* — Jess Whittington
(74) *Attorney, Agent, or Firm* — Patrick M. Sheldrake

(57) ABSTRACT

A control system for a machine with a dual path electronically controlled hydrostatic transmission is used to achieve a desired performance and a desired operator feel while performing all of the machine operations. The control system includes pump and motor displacement resolvers, command resolver, ramping blocks, pump and motor steering resolvers, engine load management and a straight tracking subsystem.

13 Claims, 5 Drawing Sheets

(56) References Cited

U.S. PATENT DOCUMENTS

| | | | |
|---|---|---|---|
| 5,177,964 A | 1/1993 | Tanaka et al. | |
| 5,178,229 A | 1/1993 | Strenzke | |
| 5,246,081 A | 9/1993 | Engle | |
| 5,394,696 A | 3/1995 | Eich et al. | |
| 5,419,128 A | 5/1995 | Asano et al. | |
| 5,553,453 A | 9/1996 | Coutant et al. | |
| 5,574,642 A | 11/1996 | Cooper | |
| 5,590,041 A | 12/1996 | Cooper | |
| 5,873,427 A | 2/1999 | Ferguson et al. | |
| 6,138,782 A * | 10/2000 | Anderson | B62D 11/183 180/6.44 |
| 6,454,033 B1 * | 9/2002 | Nathan | B60K 17/02 180/307 |
| 6,739,128 B2 | 5/2004 | Boyer et al. | |
| 7,146,263 B2 | 12/2006 | Guven et al. | |
| 7,147,078 B2 | 12/2006 | Teslak et al. | |
| 7,210,293 B2 | 5/2007 | Fukasawa et al. | |
| 7,287,620 B2 | 10/2007 | Thomas et al. | |
| 7,469,534 B2 | 12/2008 | Nishi et al. | |
| 7,930,843 B2 | 4/2011 | Hartwick | |
| 8,020,659 B2 | 9/2011 | Schultz et al. | |
| 2002/0133279 A1 * | 9/2002 | Manring | B62D 55/125 701/50 |
| 2003/0010026 A1 * | 1/2003 | Evans | B60K 17/10 60/443 |
| 2005/0177291 A1 | 8/2005 | Strashny et al. | |
| 2006/0070746 A1 | 4/2006 | Lumpkins et al. | |
| 2006/0191732 A1 * | 8/2006 | Lunzman | E02F 9/2235 180/307 |
| 2008/0128189 A1 * | 6/2008 | Pruitt | B62D 11/001 180/197 |
| 2010/0089051 A1 * | 4/2010 | Ohtsukasa | B60W 30/18172 60/451 |
| 2010/0137102 A1 | 6/2010 | Sopko, Jr. et al. | |
| 2010/0154403 A1 | 6/2010 | Brickner et al. | |
| 2011/0196585 A1 | 8/2011 | Ishibashi et al. | |
| 2011/0202243 A1 * | 8/2011 | Ishibashi | E02F 9/202 701/51 |
| 2012/0076670 A1 | 3/2012 | Rampen et al. | |
| 2012/0152642 A1 | 6/2012 | Takahashi et al. | |
| 2012/0166050 A1 * | 6/2012 | Anderson | E02F 9/2253 701/51 |
| 2013/0131937 A1 * | 5/2013 | Anderson | F16H 61/452 701/51 |
| 2014/0075930 A1 * | 3/2014 | Maiyur | F04B 13/00 60/327 |

* cited by examiner

CONTROL SYSTEM FOR A MACHINE WITH A DUAL PATH ELECTRONICALLY CONTROLLED HYDROSTATIC TRANSMISSION

CROSS-REFERENCE TO RELATED APPLICATIONS

This application claims the benefit of U.S. Provisional Application No. 61/740,788, filed Dec. 21, 2012, entitled CONTROL SYSTEM FOR A HYDROSTATIC SYSTEM, U.S. Provisional Application No. 61/740,772, filed Dec. 21, 2012, entitled LOAD CONTROL FOR MACHINES WITH HYDROSTATIC TRANSMISSION AND/OR IMPLEMENT SYSTEM, U.S. Provisional Application No. 61/740,750, filed Dec. 21, 2012, entitled STRAIGHT TRACKING CONTROL SYSTEM FOR A CRAWLER-TRACTOR, U.S. Provisional Application No. 61/740,811, filed Dec. 21, 2012, entitled CONTROL SYSTEM FOR A HYDROSTATIC SYSTEM USING SCALED RAMPS, which Applications are incorporated by reference herein in their entirety.

BACKGROUND

The present application relates generally to a control system for a machine with a dual path electronically controlled hydrostatic transmission having variable displacement pumps and/or variable displacement motors.

One type of machine with a dual path electronically controlled hydrostatic transmission or a dual path electro-hydraulic transmission that is used for the propulsion and steering can be a crawler-tractor such as a bulldozer. "Bulldozers" or "dozers," as those terms may be used herein, refer to crawler-tractors that are equipped with a blade for scraping the ground or pushing material along the ground. The blade is pivotally connected to the crawler-tractor chassis such that it can pivot up and down. Blade controls are provided to the operator in the cab of the vehicle to permit the operator to raise and lower the blade with respect to the chassis of the crawler-tractor. One of the most common uses for blades on bulldozers is to level or otherwise contour the ground for the construction of houses, buildings, parking lots, and roads.

When an operator performs a rapid acceleration or deceleration of the machine in a forward or reverse direction, the result is a sudden increase or decrease of transmission oil flow. In response to the sudden increase or decrease of transmission oil flow, a resultant increase in torque is translated to the engine. The sudden increase in torque can cause a reduction in the engine speed resulting in a sudden drop in machine speed, which is undesirable to the operator. In other words, the generation of a high torque can exceed engine torque limits and cause engine lug down.

When executing a turn for a machine with a dual path electronically controlled hydrostatic transmission, the sliding friction between the wheels or track drives and the ground increase as the turning radius of the machine decreases. In response to this increased friction, an increase in torque is translated to the engine of the machine by way of increased driveline pressures. The transmission of the machine has a finite pressure limit governed by system relief valves. When the transmission system pressure increases to the relief valve setting, the machine may stall. In order to prevent stalling as a turn is executed, the motor displacement in the transmission must increase to effectively decrease the pressure. The increase in motor displacement causes the machine speed to decrease leading to operator dissatisfaction.

Further, the machine can be used for heavy-duty operations such as push-pull operations, lifting operations, digging operations, etc. Performing these heavy-duty operations can stall the engine by creating a torque load that exceeds the available torque of the engine.

Machines with a dual path electronically controlled hydrostatic transmission, such as the bulldozer or other crawler-tractor, can have an independent pump and motor to drive each of the left side and the right side of the machine's driveline. At times, the pump and/or motor displacement on each side of the driveline can vary in an unpredictable manner due to various reasons, including manufacturing tolerances, hydraulic driveline inefficiencies, "wear and tear" of the pump and motor components, loading conditions, etc., that can result in non-straight, i.e., curved or angled, movement of the machine when the machine is commanded or steered in a straight direction.

Therefore, what is needed is a control system to control the variable pumps and variable motors used in a dual path electronically controlled hydrostatic transmission in order to maintain desired performance of the machine while performing various machine operations.

SUMMARY

One embodiment of the present invention is directed to a method for controlling a machine with an electronically controlled hydrostatic transmission. The method includes providing a machine having an engine and an electronically controlled hydrostatic transmission. The electronically controlled hydrostatic transmission includes an input device, a first drive system and a second drive system. Each of the first drive system and the second drive system have at least one pump and at least one motor controlled by a corresponding solenoid. The input device provides propulsion and steering commands for the first drive system and the second drive system. The method also includes generating current commands for the solenoids of the at least one pump and the at least one motor of each of the first drive system and the second drive system based on the propulsion command, the steering command and at least one measured machine operating parameter and applying the current commands to the solenoids of the at least one pump and the at least one motor of each of the first drive system and the second drive system.

Another embodiment of the present invention is directed to a control system for a machine with a hydrostatic transmission. The control system includes a first drive system and a second drive system. The first drive system includes a first pump solenoid and a first motor solenoid, a first pump controlled by the first pump solenoid and a first motor controlled by the first motor solenoid and powered by the first pump. The second drive system includes a second pump solenoid and a second motor solenoid, a second pump controlled by the second pump solenoid and a second motor controlled by the second motor solenoid and powered by the second pump. The control system includes an operator input device to generate a propulsion command and a steering command in response to user manipulation of the operator input device. The control system also includes a control device to generate current commands for the first pump solenoid, the first motor solenoid, the second pump solenoid and the second motor solenoid based on the propulsion command, the steering command and at least one system operating parameter.

In one embodiment, the control system for the hydrostatic transmission operates to maintain a margin of additional pump displacement even at the top vehicle speed. As a turn is executed at the maximum vehicle speed using the operator input device, motor displacement is increased in order to overcome the friction between the machine tracks and the ground during the turn. Also, the displacement of the pump located at the same direction of the turn, e.g., the left pump during a left turn, is reduced while the displacement of the opposite pump, e.g., the right pump during a left turn, is increased during the turn. The radius of the turn is determined by the differential between the left and right pump displacements. The increase or decrease of the pump and motor displacements can be performed by a separate subsystem. The subsystem can use software logic, look-up tables, curves, etc., to perform the changes in pump and motor displacements.

In another embodiment, a load management subsystem can be used to increase the load carrying capacity of the machine by appropriately managing the engine load. The load management subsystem can utilize reference engine speed or revolutions per minute (RPM), measured engine speed or RPM, and/or transmission oil temperature to modify pump and motor displacements in order to reduce the engine load.

In yet another embodiment, a straight tracking subsystem can be used to maintain straight movement of the machine by automatically changing one of the pump displacements, e.g. the left or right, in response to a difference between the left and right track velocity or speed when the machine is commanded to move in a straight direction.

In a further embodiment, a subsystem can be used to modify and/or limit the rate of change of the pump and motor displacement commands. By modifying and/or limiting the rate of change of pump and motor displacement commands in response to performing a rapid acceleration or deceleration of the machine with the operator input device, a corresponding reduction in the torque transmitted to the engine can be obtained and operator comfort can be increased by elimination of undesirable jerks caused by rapid acceleration and deceleration.

One advantage of the present application is that the variable displacement pumps and motors of the dual path electronically controlled hydrostatic transmission are controlled such that the machine can steer through a turn while maintaining as much speed as possible.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE EXEMPLARY EMBODIMENTS

In one exemplary embodiment, a machine with a dual path electronically controlled hydrostatic transmission (also referred to as a dual path electro-hydraulic transmission or ground drive system) can be a crawler-tractor. "Crawler-tractor" refers to any of the class of work vehicles or machines having a chassis, with an engine and ground-engaging endless-loop tracks that are located on either side of the chassis, that are driven by the engine, and that move the chassis over the ground. "Dozer" or "bulldozer" as used herein refers to a crawler-tractor coupled to a blade. Other examples of crawler-tractors can include harvesters, excavators and compact track loaders. Other examples of machines with dual path electronically controlled hydrostatic transmissions can include wheeled harvesters, wheeled excavators and wheeled compact loaders.

Figure 1:
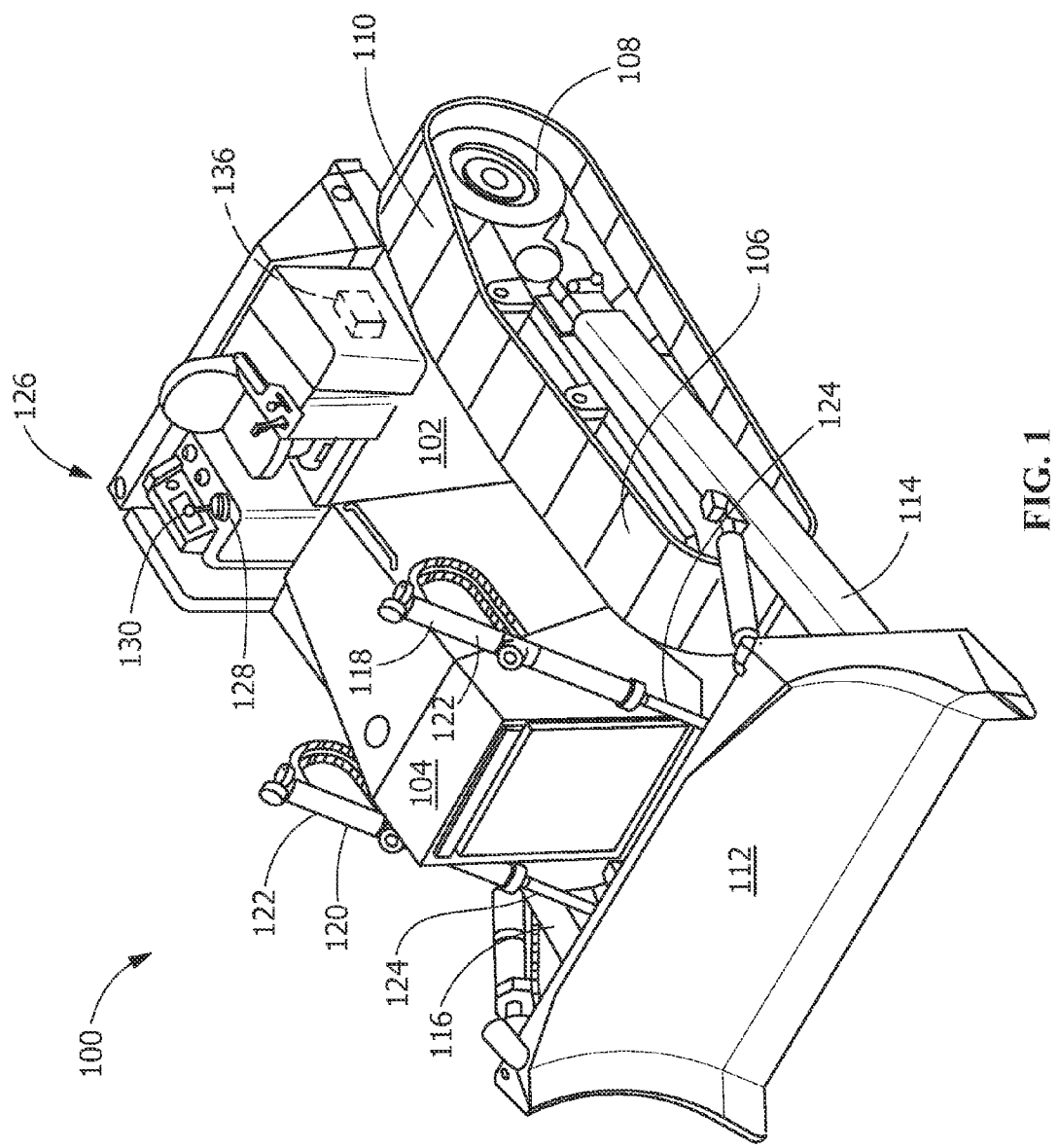
FIG. 1 shows a perspective view of an exemplary embodiment of a crawler-tractor.

Referring to FIG. 1, a crawler-tractor is shown. The crawler-tractor 100 includes a chassis 102 and an engine 104 fixed to the chassis 102. Crawler-tractor 100 also includes left side and right side drive systems 106, each of which includes a drive wheel 108 that is driven by a motor and an endless track 110 that is coupled to and driven by the drive wheel 108. The crawler-tractor 100 also includes a laterally extending blade 112 that is mounted to a left arm 114 and a right arm 116. Since the crawler-tractor shown in FIG. 1 includes a blade 112, the crawler-tractor 100 can also be referred to as a bulldozer or dozer 100. The arms 114, 116 of the dozer 100 can be pivotally coupled to the chassis 102 at the ends of the arms 114, 116 opposite the blade 112. The arms 114, 116 can be assisted in supporting the blade 112 by left and right hydraulic lift cylinders 118, 120. The left and right cylinder portions 122 of the hydraulic lift cylinders 118, 120 are coupled to the chassis 102 and the left and right rod ends 124 are coupled to the blade 112. When the operator extends or retracts cylinders 118, 120, the cylinders 118, 120 increase or decrease in length and lower or raise blade 112.

The operation of the dozer 100 can be controlled by an electronic controller 136. Electronic controller 136 can be a digital microprocessor-based controller having a RAM (random access memory), ROM (read only memory), CPU (central processing unit), sensor input and signal conditioning circuits, valve driver circuits, other memory devices, communications and interface circuits, and other control related components. The sensors and switches are coupled to the sensor input and signal conditioning circuits, the pilot valves and solenoids can be coupled to the valve driver circuits and other digital controllers can be coupled to the communications circuit. The ROM and other memory devices can store the CPU instructions that constitute the programs that are used in the operation of the dozer 100, the RAM and other memory devices can provide working space for the CPU to store values that change during operation, and the CPU executes the program instructions stored in ROM. All of these components can be coupled together by data, address and control buses in a conventional manner.

Dozer 100 has an operator's compartment or cab 126 from which the operator operates dozer 100. Among other controls, the cab 126 can include an operator input device 128 (e.g., a joystick) that the operator manipulates to steer and control the speed of the dozer 100. In one embodiment, the operator input device 128 can include a lever 130 with a neutral central position. Each of the left side and right side drive systems 106 are controlled with the operator input device 128. The operator input device 128 can be used to provide steering and speed control commands to each of the left side and right side drive systems 106 based on the "x-y" displacement of the operator input device 128 from the neutral (or center) position. In one embodiment, the operator can instruct the drive systems 106 by moving the input device 128 in one direction from neutral to move the machine or dozer 100 forward and can move the input device 128 in the other direction to move the machine or dozer 100 backward. By controlling the direction and amount that the operator input device 128 is moved from the neutral position, the operator can control the speed and direction of the machine or dozer 100.

Figure 2:
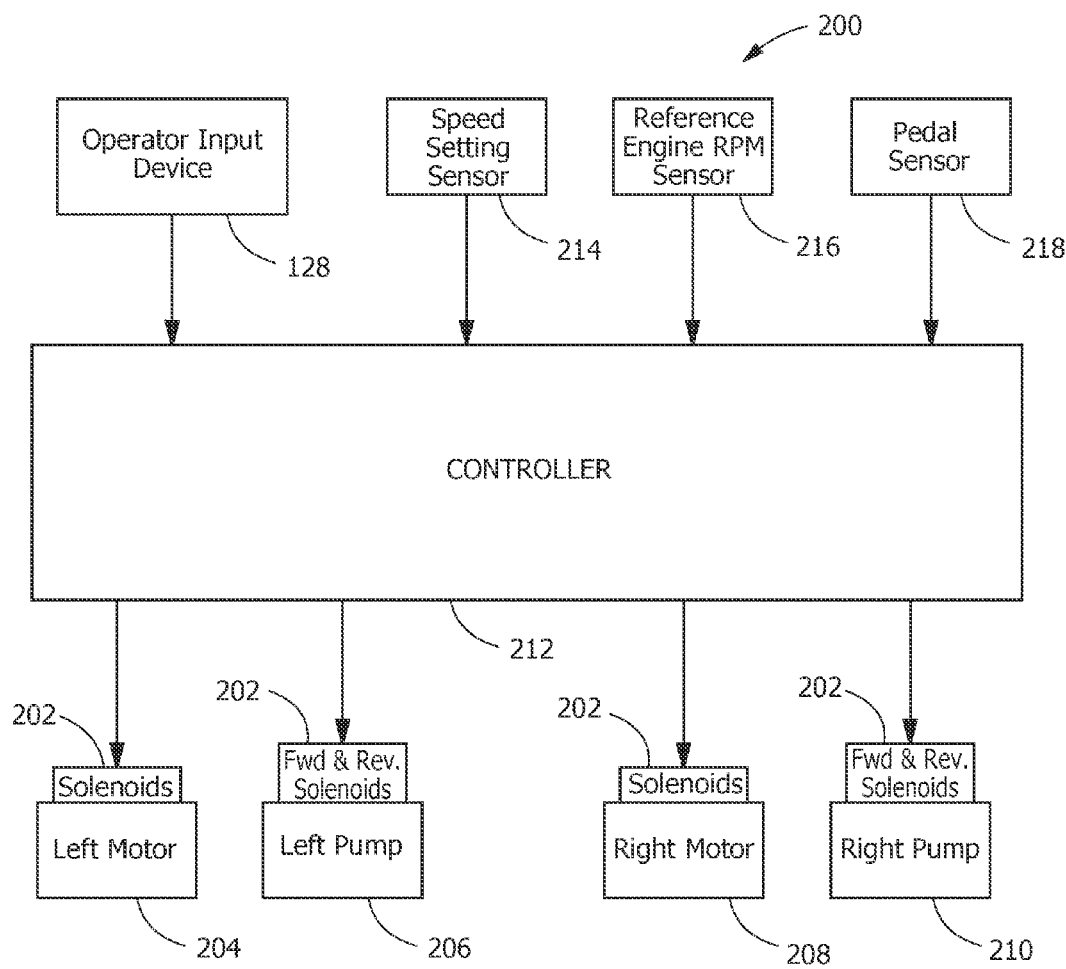
FIG. 2 shows a block diagram of an exemplary embodiment of a ground drive control system for a machine with a dual path electronically controlled hydrostatic transmission.

FIG. 2 shows an embodiment of a ground drive control system 200 for a machine such as a crawler tractor or the dozer 100. The ground drive control system 200 can be part of the controller 136 either as an integrated system or a "stand-alone" subsystem. In another embodiment, the ground drive control system 200 can be separate system that can operate with little or no interaction with controller 136. The ground drive control system 200 can be used to control a dual path electronically controlled hydrostatic transmission system having variable displacement pumps and variable displacement motors. The pump and motor displacements can be determined by the ground drive control system based on selected speed range, engine RPM, joystick position, pedal position and many other factors.

The ground drive control system 200 can be used to provide control signals or instructions to solenoids 202 that are used to control the operation of a left motor 204, a left pump 206, a right motor 208 and a right pump 210. The left pump 206 provides power to the left motor 204 which in turn drives a corresponding left drive wheel 108 and left track 110 (if a track vehicle). The right pump 210 provides power to the right motor 208 which in turn drives a corresponding right drive wheel 108 and right track 110 (if a track vehicle). In one exemplary embodiment, the left pump 206 and the right pump 210 can be controlled by forward and reverse solenoids 202.

A controller 212 can provide the control signals to the solenoids 202 based one or more input parameters. The input parameters can include propulsion and steering commands from the operator input device 128, a speed setting from a speed setting sensor 214, reference engine speed or revolutions per minute (RPM) from a reference engine RPM sensor 216 and a pedal signal or percentage from a pedal sensor 218. In one exemplary embodiment, the propulsion command from the operator input device 128 can be based on movement of the operator input device 128 along the Y-axis and can control the direction of movement (forward or reverse) and contribute to the magnitude of the vehicle speed. The steering command can be based on movement of the operator input device 128 along the X-axis and can control the pump and motor displacements through turns. The pedal signal or percentage from pedal sensor 218 can be based on amount a pedal, e.g., a brake pedal, is pressed and can increase or decrease the displacement commands to the pumps and motors based on the position of the pedal while the machine is moving in either the forward or reverse direction. The speed setting can correspond to a value selected by the operator with an input device and can contribute to the magnitude of the maximum machine speed in either the forward or reverse direction. The reference engine RPM can correspond to the position of a hand lever (e.g., a throttle) and can be used to scale the magnitude of the displacement command applied to the pump and motor solenoids if the reference engine RPM is below a predetermined threshold value. If the reference engine RPM is above the predetermined threshold value, then the reference engine RPM does not modify the pump or motor displacement command.

Figure 3:
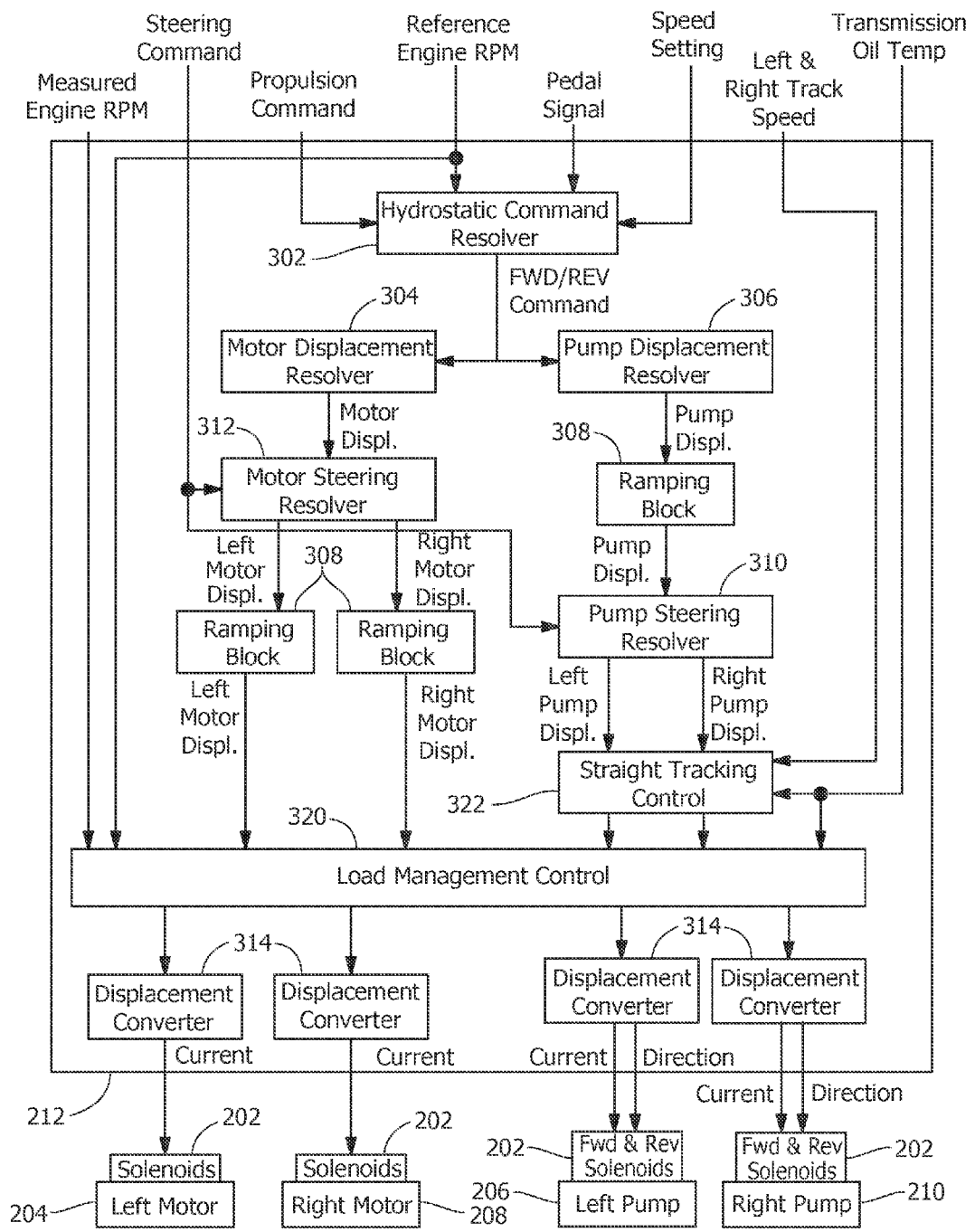
FIG. 3 shows a block diagram of an exemplary embodiment of a controller for the ground drive control system.

FIG. 3 shows an embodiment of the controller from the ground drive control system. The controller 212 has hydrostatic command resolver 302 that can receive the propulsion command from the operator input device 128, the reference engine RPM from the reference engine RPM sensor 216, the pedal signal from the pedal sensor 218 and the speed setting from the speed setting sensor 214. The hydrostatic command resolver 302 can process the input parameters and generate a forward or reverse (FWD/REV) command for a motor displacement resolver 304 and a pump displacement resolver 306.

In one exemplary embodiment, the hydrostatic command resolver 302 can include a microprocessor that can execute one or more control instructions to generate the forward or reverse (FWD/REV) command using equation 1:

$$\text{FWD/REV command} = J \times B \times S \times W \qquad (1)$$

wherein
J=propulsion command from the operator input device;
B=pedal signal (percentage) from the pedal sensor;
S=a value based on the speed setting from the speed setting sensor; and
W=a value based on the reference engine RPM from the reference engine RPM sensor.

In one exemplary embodiment, the propulsion command can be a value between −100 and 100, the speed setting can be value between 1 and 15 and S can be determined such that there is an equal amount of speed increase or decrease with each consecutive speed setting value. In another exemplary embodiment, W can be 1 if the reference RPM is greater than a preselected RPM threshold value, e.g., 1500 and if the reference RPM is less than the preselected RPM threshold value, W can be calculated by equation 2.

$$W = \frac{\text{Reference Engine } RPM - \text{Tunable Parameter}}{\text{Preselected } RPM \text{ Threshold} - \text{Tunable Parameter}} \qquad (2)$$

In an exemplary embodiment, the FWD/REV command can be a value in the range from −100 to 100. The hydrostatic command resolver 302 can be used to modify or adjust the propulsion command from the operator input device 128 in view of other operating parameters such as brake pedal position, speed setting and engine RPM.

Figure 4:
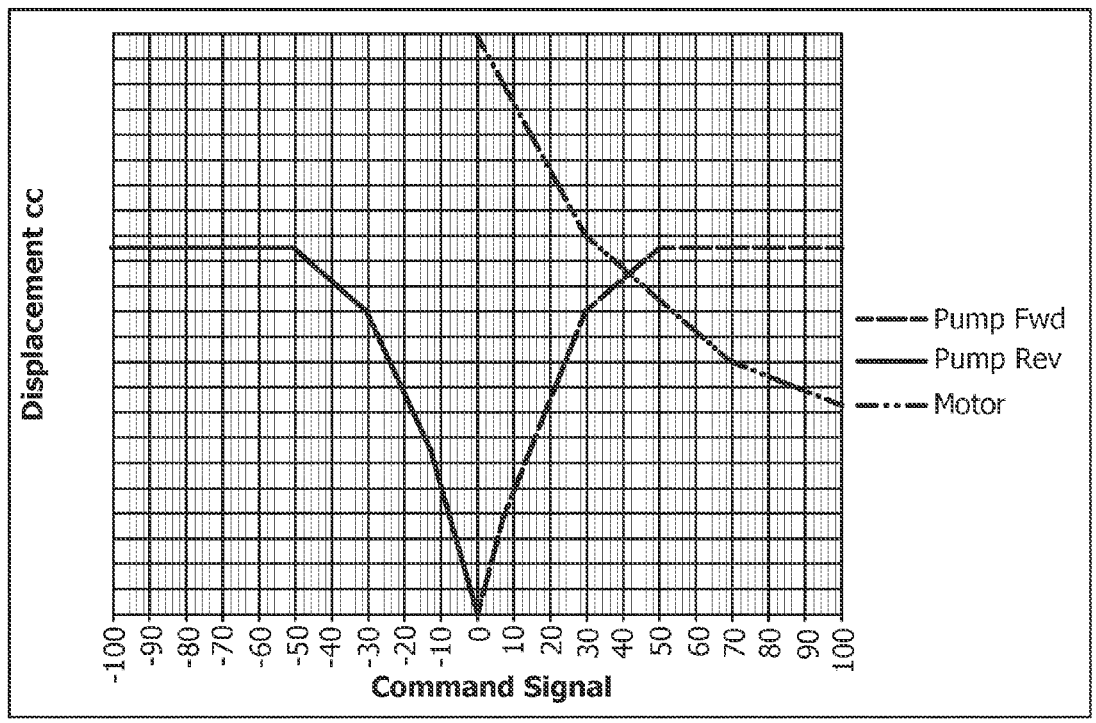
FIG. 4 shows an exemplary embodiment of pump and motor displacement curves used by the ground drive control system.

The motor displacement resolver 304 can receive the forward or reverse (FWD/REV) command from the hydrostatic command resolver 302 and can convert the FWD/REV command to a motor displacement signal or value. The pump displacement resolver 306 can receive the FWD/REV command from the hydrostatic command resolver 302 and can convert the FWD/REV command to a pump displacement signal or value. The pump and motor displacements can be in cubic centimeters (cc) or other suitable unit. The command direction can be used to determine if the calculated command would be applied to the forward or reverse solenoid of the pumps 206, 210. In one exemplary embodiment, each of the pump displacement resolver 306 and motor displacement resolver 304 can include a microprocessor that can execute one or more control instructions to apply the FWD/REV command to corresponding lookup tables to generate or determine the pump displacement or the motor displacement values. The lookup tables for the pump and motor displacements can be based on the preselected pump and motor curves shown in FIG. 4.

The pump displacement signal from the pump displacement resolver 306 can then be provided to a ramping block 308. The ramping block 308 can include a microprocessor that can execute one or more control instructions to reduce the rate of change of the pump displacement signal in increasing and decreasing directions to avoid abrupt commands to the pumps 206, 210 of the ground drive control system 200. Depending on the ramping selection used by the ramping block 308, the rate of change of the pump displacement signal in increasing and decreasing directions can be gradual, moderate, or aggressive. The output signal of the ramping block (the ramped pump displacement signal) can be provided to a pump steering resolver 310. The motor displacement signal from the motor displacement resolver 304 can be provided to the motor steering resolver 312.

The motor steering resolver 312 can include a microprocessor that can execute one or more control instructions to modify left and right motor displacement signals based on a turning amount commanded by the operator input device 128. The pump steering resolver 310 can include a microprocessor that can execute one or more control instructions to modify left and right pump displacement signals based on a turning amount commanded by the operator input device 128. The motor steering resolver 312 can determine a motor steering multiplier based on the steering command from the operator input device 128. The determined motor steering multiplier is then multiplied with the motor displacement signal or value to generate the modified motor displacement signal, value, or command, during the turn. In another embodiment, the displacement range for the motor, i.e., the difference between the minimum motor displacement and the maximum motor displacement, can be multiplied by a factor that is equal to 1 minus the motor steering multiplier and the result added to the minimum motor displacement to obtain the modified motor displacement signal or value. The modified motor displacement signal or value is then used for the left and right motor displacement signals. The left and right motor displacement signals can use the same value and can be equal.

The pump steering resolver 310 can determine a left pump steering multiplier and a right pump steering multiplier based on the steering command from the operator input device 128. The determined left pump steering multiplier is then multiplied with the ramped pump displacement signal or value to generate the left pump displacement signal, value, or command, during the turn and the determined right pump steering multiplier is multiplied with the ramped pump displacement signal or value to generate the right pump displacement signal, value, or command, during the turn. In an exemplary embodiment, the left pump steering multiplier and the right pump steering multiplier can modify or limit the pump displacement during straight movement of the machine to provide a margin of pump displacement for minor straight tracking corrections during the straight travel. In another exemplary embodiment, the left pump steering multiplier and the right pump steering multiplier can modify or limit the pump displacement during straight movement of the machine to provide a margin of pump displacement to be available during a steering event.

Figure 5:
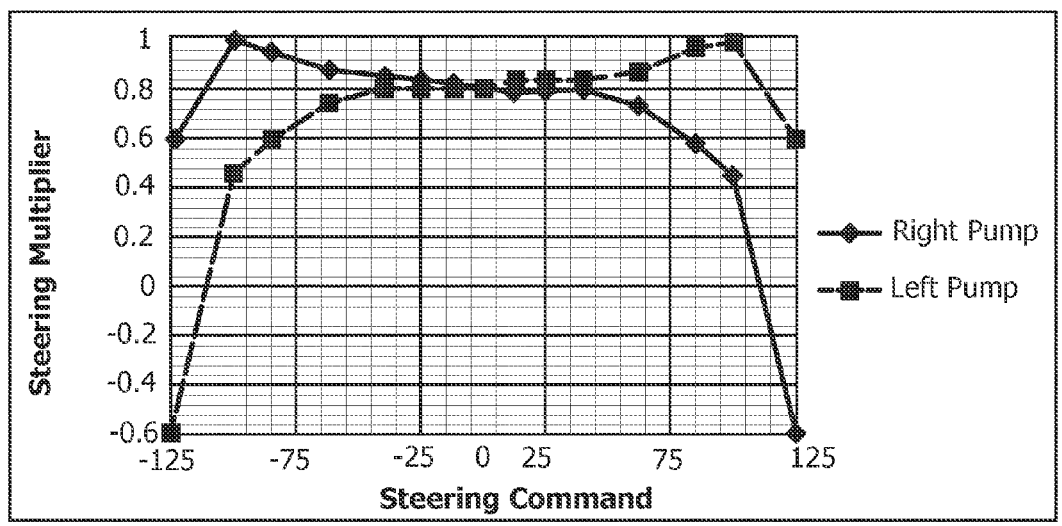
FIG. 5 shows an exemplary embodiment of pump steering curves used by the ground drive control system.

In one exemplary embodiment, pump steering resolver 310 and motor steering resolver 312 can use lookup tables that are based on the preselected pump and motor curves to determine the motor steering multiplier, the left pump steering multiplier and the right pump steering multiplier. Table 1 provides some exemplary values of the lookup tables for the pump steering resolver 310 and motor steering resolver 312. FIG. 5 shows and exemplary embodiment of the left and right pump steering curves associated with Table 1.

TABLE 1

| Steering Command | Right Pump | Left Pump | Motor |
|---|---|---|---|
| 125 | −0.6 | 0.6 | 0.0 |
| 100 | 0.45 | 1 | 0.50 |
| 85 | 0.58 | 0.95 | 0.60 |
| 62 | 0.73 | 0.87 | 0.75 |
| 40 | 0.79 | 0.84 | 0.86 |
| 25 | 0.79 | 0.83 | 0.93 |
| 12 | 0.79 | 0.82 | 0.98 |
| 0 | 0.8 | 0.8 | 1.0 |
| 0 | 0.8 | 0.8 | 1.0 |
| −12 | 0.82 | 0.79 | 0.98 |
| −25 | 0.83 | 0.79 | 0.93 |
| −40 | 0.84 | 0.79 | 0.86 |
| −62 | 0.87 | 0.73 | 0.75 |
| −85 | 0.95 | 0.58 | 0.60 |
| −100 | 1 | 0.45 | 0.50 |
| −125 | 0.6 | −0.6 | 0.0 |

The pump steering resolver 310 can also receive the steering signal or value (+ for steering right and − for steering left) from the operator input device 128. The pump steering resolver 310 can then select the appropriate steering multiplier for left or right pump displacements based on the steering direction (i.e., steering left or right). In one exemplary embodiment, the lookup tables or curves for the motor steering multiplier, the left pump steering multiplier and the right pump steering multiplier can be selected from a group of lookup tables or curves having smooth or gradual, moderate, or aggressive parameters. Some examples of the calculation of the modified motor displacement signal and the left and right pump displacement signals are provided in Examples 1-3. For Examples 1-3, the motor can have a minimum displacement of 83 cc, a maximum displacement of 230 cc and an operating range of 147 cc.

Example 1

Propulsion Command=100, Steering Command=0 (No Steering; Straight Movement)

| Pump/Motor Displacement | Steering Multiplier | Output: |
|---|---|---|
| Pump = 145 cc | Left Pump = 0.8 | L Pump = 145 cc*0.8 = 116 cc |
| | Right Pump = 0.8 | R Pump = 145 cc*0.8 = 116 cc |
| Motor = 83 cc | Motor = 1.0 | Motor = 147 cc*(1-1.0) + 83 cc = 83 cc |

Example 2

Propulsion Command=100, Steering Command=40 (Right Turn)

| Pump/Motor Displacement | Steering Multiplier | Output: |
|---|---|---|
| Pump = 145 cc | Left Pump = 0.84 | L Pump = 145 cc*0.84 = 121.8 cc |
| | Right Pump = 0.79 | R Pump = 145 cc*0.79 = 114.55 cc |
| Motor = 83 cc | Motor = 0.86 | Motor = 147 cc*(1-0.86) + 83 cc = 103.58 cc |

Example 3

Propulsion Command=100, Steering
Command=−125 (Counter-Rotate)

| Pump/Motor Displacement | Steering Multiplier | Output: |
|---|---|---|
| Pump = 145 cc | Left Pump = 0.6<br>Right Pump = −0.6 | Left Pump = 145 cc*0.6 = 87 cc<br>Right Pump = 145 cc*0.6 = 87 cc<br>(in the reverse direction) |
| Motor = 83 cc | Motor = 0.0 | Motor = 147 cc*(1−0.0) + 83 cc = 230 cc |

After the left and right motor displacement signals or values are generated by the motor steering resolver 312, the left and right motor displacement signals are applied to ramping blocks 308. The ramping blocks 308 can include a microprocessor that can execute one or more control instructions to smooth out the left and right motor displacement signals by controlling the rate of change of the motor displacement signal in order to avoid abrupt commands to the motors 204, 208 of the ground drive control system 200. Depending on the ramping selection used by the ramping blocks 308, the rate of change of the left and right motor displacement signals can be gradual, moderate, or aggressive. The aggressive ramp can be limited by the engine's response to a change in load. The output signals of the motor ramping blocks 308 can be provided to load management or load control subsystem 320. In addition, the left and right pump displacement signals can be provided to straight tracking control subsystem 322. The output of the straight tracking control subsystem 322 is provided to the load management subsystem 320. The output of the load management subsystem 320 is provided to the displacement converters 314. In another embodiment, the ground drive control system does not have to use either or both of the straight tracking control subsystem 322 and the load management subsystem 320.

The displacement converters 314 take the modified left and right motor displacement signals and the left and right pump displacement signals, all of which are in terms of displacement, e.g., cc, and convert the signals into current commands to drive the solenoids 202. In addition, the displacement converters 314 can take the left and right pump displacement signals and convert the signals into direction commands or signals for the pump solenoids 202. The direction signal can be used to determine if the current command is applied to the forward or reverse solenoid for the pump.

Figure 6:
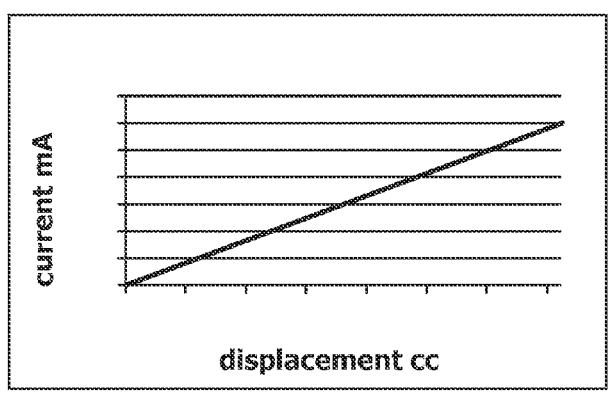
FIG. 6 shows an exemplary embodiment of a curve showing pump solenoid current values with respect to pump displacement values used by the ground drive control system.

In one exemplary embodiment, each of the displacement converters 314 can include a microprocessor that can execute one or more control instructions to apply the displacement signal to a corresponding lookup table to generate or determine the solenoid current commands. The lookup table(s) for the solenoid current commands can be based on the preselected solenoid curves shown in FIG. 6. In one embodiment, one or more lookup tables and/or curves can be used and can be adapted to a specific component. In another embodiment, the displacement converter 314 determines the direction signal based on whether the displacement signal has a positive or negative value. If the displacement signal has a positive value the direction signal is used to apply current to the forward pump solenoid and if the displacement signal has a negative value the direction signal is used to apply current to the reverse pump solenoid.

Figure 7:
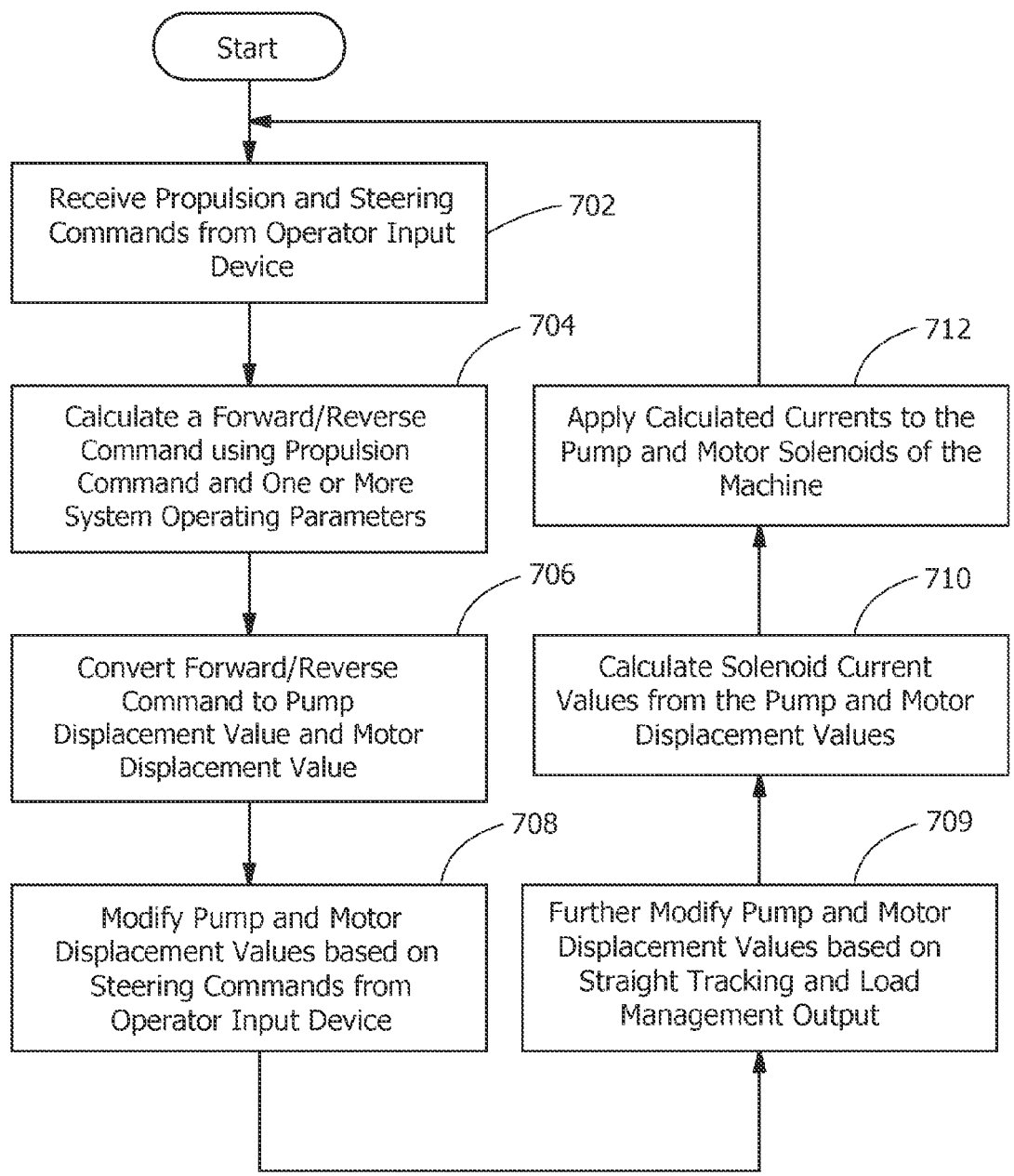
FIG. 7 shows an exemplary process for implementing ground drive control on a machine.

FIG. 7 shows an exemplary process for implementing the ground drive control on a machine or crawler-tractor. The process begins by receiving propulsion and steering commands from the operator input device 128 (step 702). A forward/reverse (FWD/REV) command can be determined or calculated from the propulsion command and one or more system operating parameters, which may include a speed setting, a reference engine RPM, and a brake pedal position signal (step 704). The FWD/REV command can then be converted to a pump displacement command or value and a motor displacement command or value (step 706). In one exemplary embodiment, a direction can also be calculated from the FWD/REV command. The steering command from the x-axis of the operator input device 128 can then be used to determine or calculate modified pump and motor displacement commands or values (step 708). In one exemplary embodiment, the pump displacement value can be applied to a ramping block. In another exemplary embodiment, the pump displacement values can include left and right pump displacement values and the motor displacement values can include left and right motor displacement values. The modified pump and motor displacement commands or values can be further modified by straight tracking and load management controls, if present (step 709). The modified pump displacement values and the modified motor displacement values can be converted to or used to calculate solenoid current values or commands (step 710). In one exemplary embodiment, the motor displacement values, e.g., the left and right motor displacement values, can be applied to ramping blocks before being converted to solenoid current commands. The calculated solenoid current commands are then applied to the solenoids of the pumps and motors of the machine (step 712).

It should be understood that the application is not limited to the details or methodology set forth in the following description or illustrated in the figures. It should also be understood that the phraseology and terminology employed herein is for the purpose of description only and should not be regarded as limiting.

The present application contemplates methods, systems and program products on any non-transitory machine-readable media for accomplishing its operations. The embodiments of the present application may be implemented using existing computer processors, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

In the further consideration of the drawings of this application and the discussion of such drawings and the elements shown therein, it should also be understood and appreciated that, for purposes of clarity in the drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already be widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A method for controlling a machine with an electronically controlled hydrostatic transmission, the method comprising:
providing a machine having an engine and an electronically controlled hydrostatic transmission, the electronically controlled hydrostatic transmission including an input device, a first drive system and a second drive system, each of the first drive system and the second drive system having at least one pump and at least one motor controlled by a corresponding solenoid, the input device providing propulsion and steering commands for the first drive system and the second drive system;
generating current commands for the solenoids of the at least one pump and the at least one motor of each of the first drive system and the second drive system based on the propulsion command, the steering command and at least one measured machine operating parameter; and
applying the current commands to the solenoids of the at least one pump and the at least one motor of each of the first drive system and the second drive system, said generating current commands for the solenoids includes calculating a first command based on the propulsion command, a brake pedal position, a speed setting and a reference engine speed, said generating current commands for the solenoids includes converting the first command into a pump displacement value and a motor displacement value, said generating current commands for the solenoids includes: determining a modified motor displacement value from the motor displacement value and the steering command; and determining a modified pump displacement value from the pump displacement value and the steering command, said determining a modified pump displacement value includes modifying the pump displacement value by a ramping block value to thereby effect a change in a rate of change of pump displacement values, the rate of change of the pump displacement values being changed while the applying step is being carried out, the ramping block value being dependent upon a ramping selection.

2. The method of claim 1 wherein said ramping selection includes one of multiple changes to the rate of change of the pump by way of the ramping block to change a rate of change of pump displacement values.

3. The method of claim 1 wherein: said determining a modified motor displacement value includes determining a first motor displacement value and a second motor displacement value; and said determining a modified pump displacement value includes determining a first pump displacement value and a second pump displacement value.

4. The method of claim 3 wherein said converting the first and second pump displacement values and the first and second motor displacement values includes modifying the first and second motor displacement values by ramping blocks to reduce a rate of change of motor displacement values.

5. The method of claim 3 wherein said determining a pump steering value includes: determining a first pump steering multiplier based on the steering command; determining a second pump steering multiplier based on the steering command; generating the first pump displacement value by multiplying the first pump steering multiplier and the pump displacement value; and generating the second pump displacement value by multiplying the second pump steering multiplier and the pump displacement value.

6. The method of claim 1 wherein said generating current commands for the solenoids includes determining a direction value for the solenoids for the at least one pump of the first drive system and the at least one pump of the second drive system, the direction value determining whether a forward solenoid or a reverse solenoid is energized.

7. A control system for a machine with a hydrostatic transmission comprising:

a first drive system comprising:
　a first pump solenoid and a first motor solenoid;
　a first pump controlled by the first pump solenoid; and
　a first motor controlled by the first motor solenoid and powered by the first pump;
a second drive system comprising:
　a second pump solenoid and a second motor solenoid;
　a second pump controlled by the second pump solenoid; and
　a second motor controlled by the second motor solenoid and powered by the second pump;
an operator input device, the operator input device generating a propulsion command and a steering command in response to user manipulation of the operator input device; and
a control device to generate current commands for the first pump solenoid, the first motor solenoid, the second pump solenoid and the second motor solenoid based on the propulsion command, the steering command and at least one system operating parameter, and
a command resolver, the command resolver calculates a first command based on the propulsion command, a brake pedal position, a speed setting and a reference engine speed,
the control device comprises:
　a pump displacement resolver to generate a pump displacement value, the pump displacement resolver comprises a pump displacement lookup table to convert the first command to the pump displacement value;
　a motor displacement resolver to generate a motor displacement value, the motor displacement resolver comprises a motor displacement lookup table to convert the first command to the motor displacement value
　a pump steering resolver to generate a first modified pump displacement value and a second modified pump displacement value, the pump steering resolver comprises a pump steering lookup table to determine a first pump steering multiplier and a second pump steering multiplier based on the steering command, the first modified pump displacement value being equal to the first pump steering multiplier multiplied by the pump displacement value and the second modified pump displacement value being equal to the second pump steering multiplier multiplied by the pump displacement value;
　a motor steering resolver to generate a first modified motor displacement value and a second modified motor displacement value, the motor steering resolver comprises a motor steering lookup table to determine a motor steering multiplier, the first modified motor displacement value being based on the motor steering multiplier and the motor displacement value and the second modified motor displacement value being based on the motor steering multiplier and the motor displacement value; and
　a ramping block positioned between the pump displacement resolver and the pump steering resolver, the ramping block modifies a rate of change of pump displacement values dependent upon a value from the ramping block, the amount by which the ramping block modifies the rate of change is determined by the value from the ramping block which is dependent upon a ramping selection, the amount by which the ramping block modifies the rate of change changes while the first command is carried out.

8. The control system of claim 7 wherein the first command corresponds to the propulsion command being reduced or increased by at least one of the brake pedal position, the speed setting or the reference engine speed.

9. The control system of claim 7 wherein the ramping selection includes one of multiple changes to the rate of change of the pump by way of the ramping block to modify a rate of change of pump displacement values.

10. The control system of claim 7 wherein the control device comprises a plurality of displacement converters, each displacement converter of the plurality of displacement converters comprises a displacement lookup table to convert the first modified pump displacement value, the second modified pump displacement value, the first modified motor displacement value or the second modified motor displacement value to a current command.

11. The control system of claim 10 wherein the control device comprises a plurality of ramping blocks positioned between the motor steering resolver and at least two displacement converters, each ramping block of the plurality of ramping blocks comprises a ramp to modify the rate of change of the first modified motor displacement values or the second modified motor displacement values.

12. The control system of claim 10 wherein at least one displacement converter generates a direction signal to control the first pump solenoid and the second pump solenoid, the direction signal controlling whether the pump is operated in a forward direction or a reverse direction.

13. The control system of claim 7 wherein the first pump solenoid comprises a first forward pump solenoid and a first reverse pump solenoid, the second pump solenoid comprises a second forward pump solenoid and a second reverse pump solenoid, a first direction signal from the control device energizing one of the first forward pump solenoid or the first reverse pump solenoid, and a second direction signal from the control device energizing one of the second forward pump solenoid or the second reverse pump solenoid.

* * * * *